United States Patent [19]
Schroeder

[11] 4,020,955
[45] May 3, 1977

[54] PART STORAGE APPARATUS

[75] Inventor: Michael J. Schroeder, Fenton, Mich.

[73] Assignee: LaSalle Machine Tool, Inc., Warren, Mich.

[22] Filed: Aug. 18, 1975

[21] Appl. No.: 605,258

[52] U.S. Cl. .................... 214/16.4 R; 198/482; 198/859; 214/16.1 A
[51] Int. Cl.² ........................................ B65G 47/00
[58] Field of Search ............. 214/61.1 R, 16.1 BA, 214/16.4 R, 16.1 A; 198/25, 209, 211, 482, 859; 74/128; 221/113, 119

[56] References Cited

UNITED STATES PATENTS

| 640,234 | 1/1900 | Smith | 198/211 |
|---|---|---|---|
| 1,808,017 | 6/1931 | Chapman | 198/211 |
| 2,166,716 | 7/1939 | Chandler | 74/128 |
| 2,187,232 | 1/1940 | Garner et al. | 74/128 |
| 2,687,825 | 8/1954 | Galin et al. | 74/128 |
| 2,834,453 | 5/1958 | Domensino | 198/211 |
| 3,018,020 | 1/1962 | Lancaster | 221/113 |

Primary Examiner—Robert J. Spar
Assistant Examiner—R. B. Johnson
Attorney, Agent, or Firm—Olsen and Stephenson

[57] ABSTRACT

Storage apparatus for storing a plurality of parts comprising a frame, a cylindrical drum having a longitudinal axis that is mounted on the frame for rotation in opposite directions about the axis, and a plurality of spaced-apart support shelves which radiate outwardly from the drum so that each shelf is substantially perpendicular of the drum surface. Adjacent shelves form a part storage compartment so that a plurality of compartments about the surface of the drum are provided. A drive mechanism mounted on the frame engages the drum to intermittently rotate the drum to successively move each compartment to a position where the parts can be fed into and removed from the compartment.

6 Claims, 9 Drawing Figures

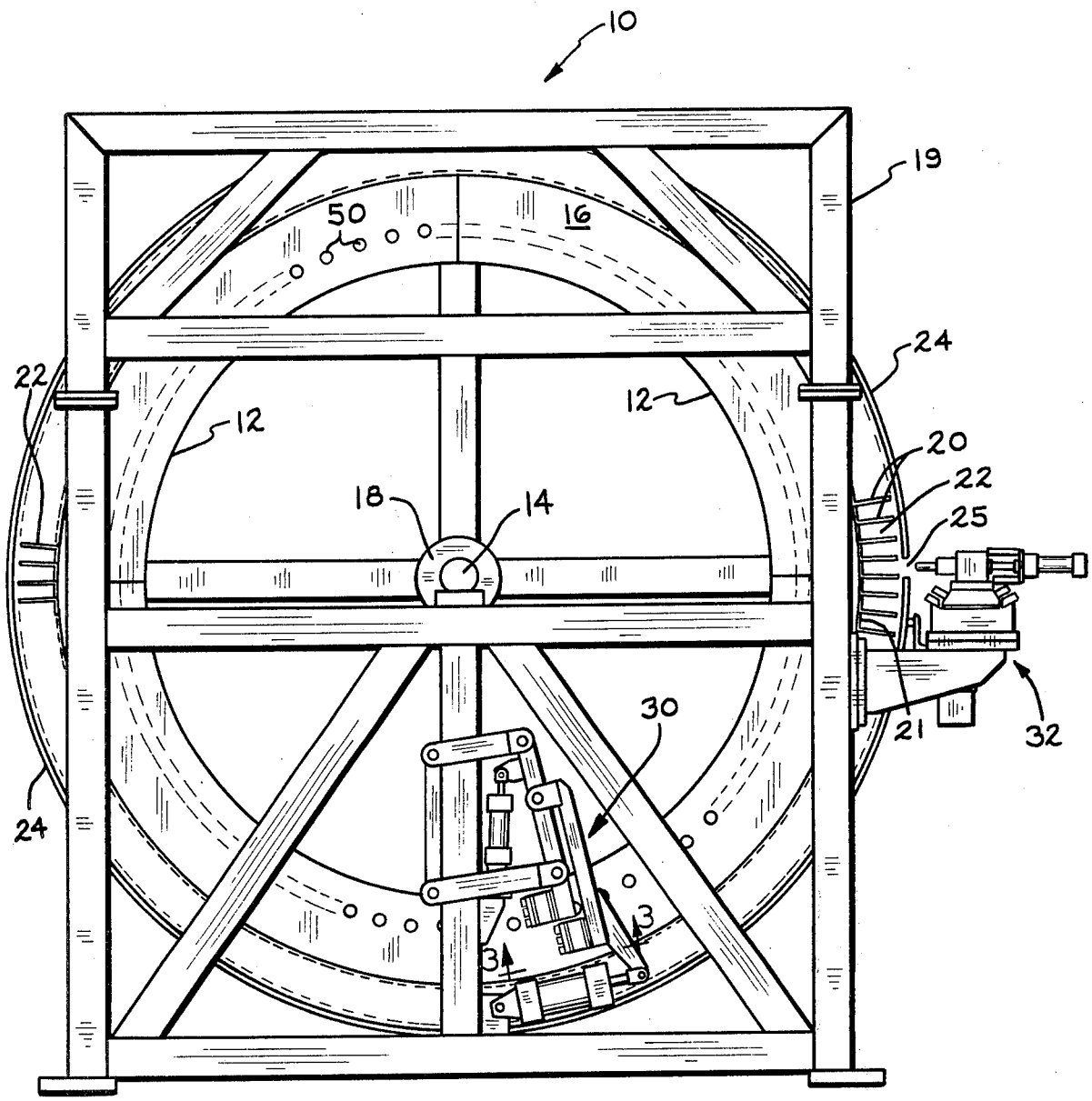
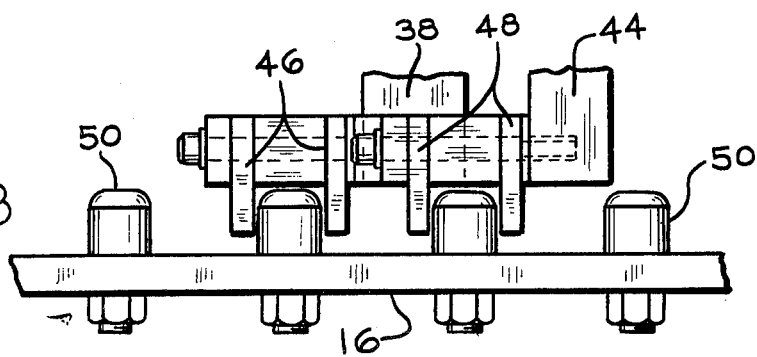

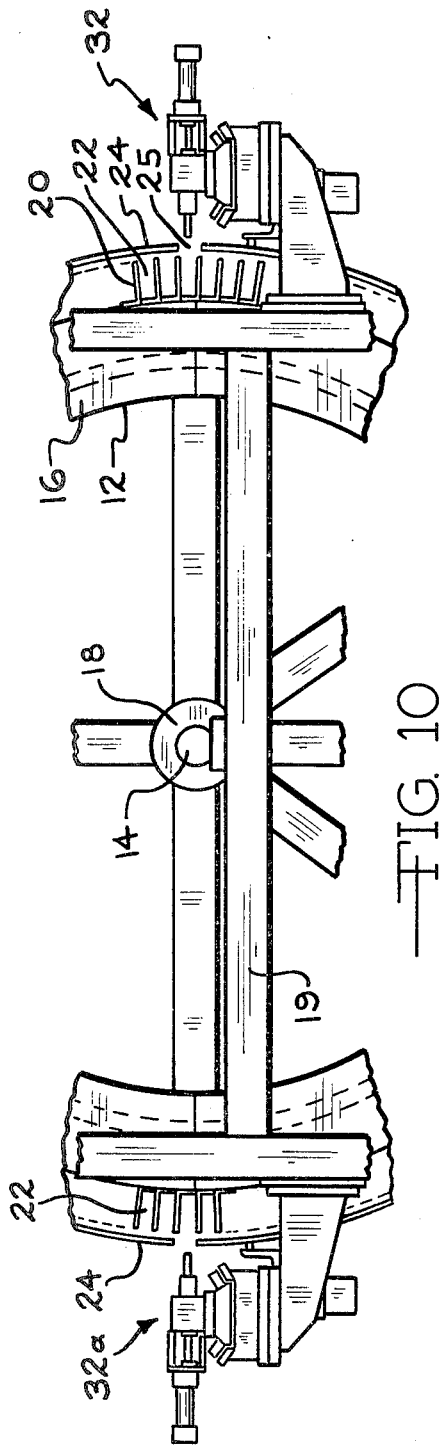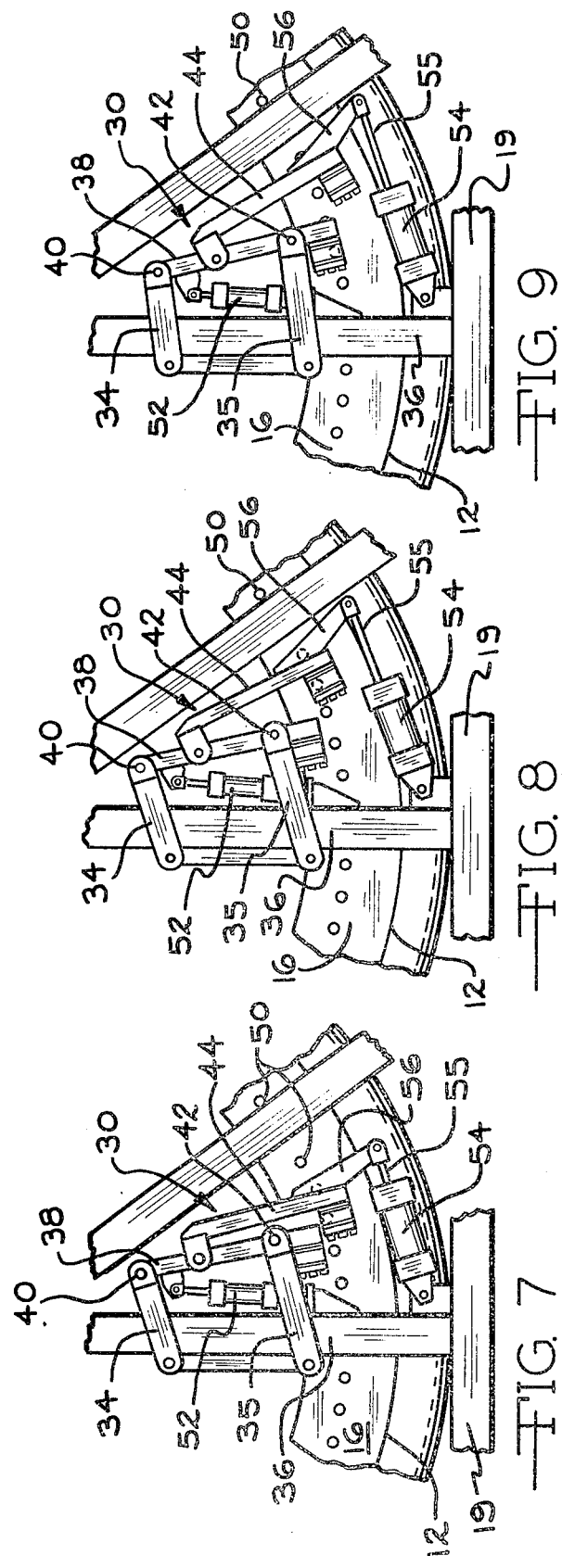

PART STORAGE APPARATUS

BACKGROUND OF THE INVENTION

Automated machine tool lines usually employ parts storage units between adjacent machines to obviate the necessity to shut down the entire line during a tool change for a single machine. In the case of lines producing parts that roll, spiral track storage units are commonly used. However, some parts, such as connecting rods, will not roll and cannot be efficiently stored in a spiral track because the flights in the track must be spaced so far apart to accommodate the parts.

The present invention provides storage apparatus consisting of a rotatable drum mounted on a frame and having a plurality of outwardly extending shelves on the surface of the drum which form compartments in which parts can be stored in an orderly manner.

Therefore, it is the object of the present invention to provide a part storage apparatus for storing parts in an orderly manner to increase efficiency in the handling and storage of parts.

SUMMARY OF THE INVENTION

The present invention consists of part storage apparatus capable of storing in an orderly manner a plurality of parts and includes a cylindrical drum mounted on a frame for rotation in opposite directions about its longitudinal axis. A plurality of support shelves extend radially outward from the surface of the drum and adjacent support shelves form a compartment so that a plurality of compartments are positioned about the surface of the drum. In one form of the invention, a plurality of circular rods are mounted on the frame in close proximity to the outer edges of the compartments to retain the parts in their respective compartments as the drum is being rotated.

In another form of the invention, the compartments are formed from a plurality of radially extending support shelves, each having a transversely extending shelf extension. The shelf extension extends perpendicularly away from the attached support shelf toward an adjacent shelf to thus retain the parts in their respective compartments.

A drive mechanism is mounted on the frame and engages the drum to intermittently rotate the drum about its longitudinal axis. The drive mechanism consists of a linkage assembly that includes a stop arm and a drive arm, each adapted at one end thereof to engage regular spaced drive pins mounted on the rim of the drum. The drive mechanism rotates the drum so that a selected compartment is positioned to receive parts from a feed mechanism.

In one form of the invention, an indexing unit is provided to feed and remove parts from the compartments and includes a plurality of retractable rods that are positioned in an in-line spaced-apart relationship and move inwardly into the compartments in response to the operation of cylinders mounted on a movable base. The base is reciprocally movable relative to the frame so that the indexing unit moves back and forth parallel to the longitudinal axis of the drum to engage a part and move it into a compartment.

In another form of the invention, two indexing units are provided which are mounted opposite each other so that one unit operates to feed parts into the storage apparatus and the other indexing unit removes parts therefrom.

In still another form of the invention, the axis of the drum is inclined to take advantage of gravity feed of the parts, in which case indexing units for feeding parts are unnecessary.

Further objects, features and advantages of the present invention will become apparent from a consideration of the following description, the appended claims and the accompanying drawing in which:

FIG. 1 is a front view of the storage apparatus of the present invention;

FIG. 3 is an enlarged fragmentary view of a portion of the drive mechanism in the storage apparatus of this invention, taken substantially from line 3—3 in FIG. 1;

Figure 5:
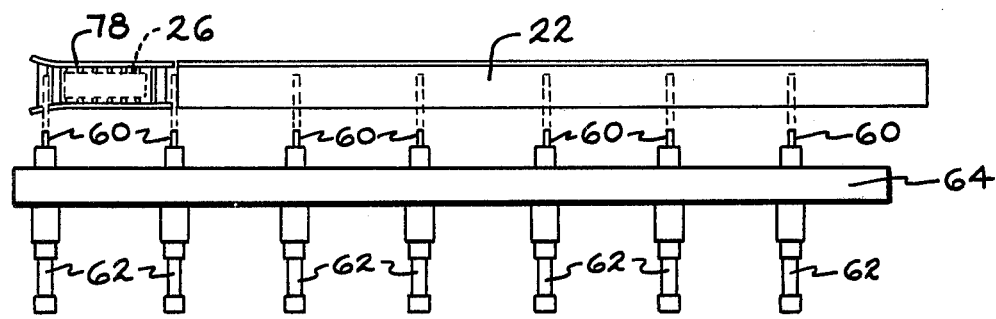
Figure 6:
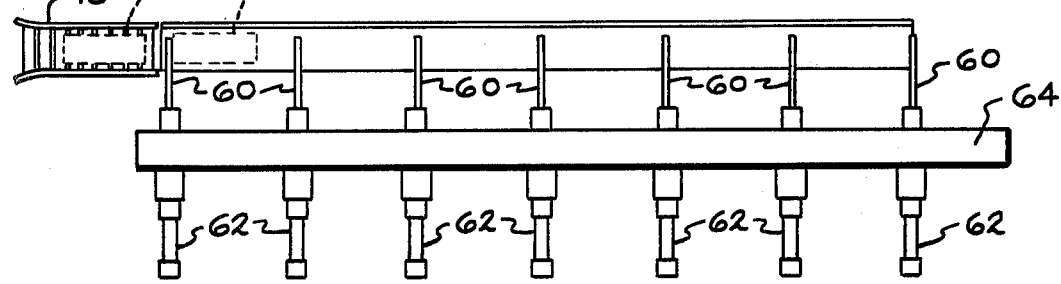
Figure 11:
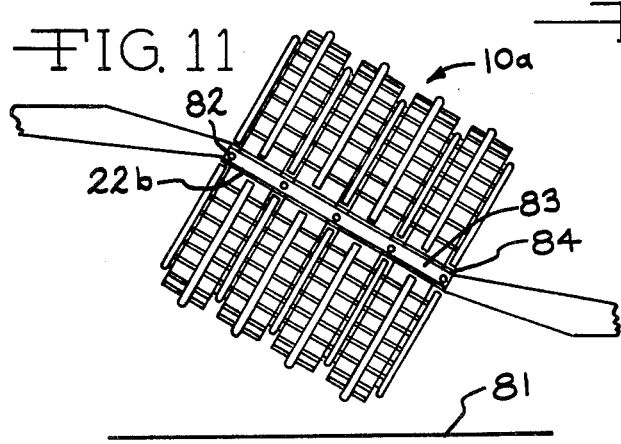
Figure 12:
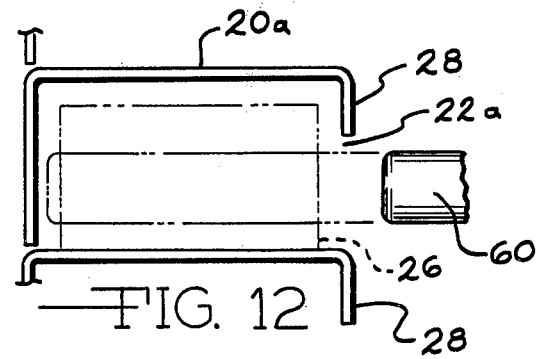

FIGS. 5 and 6 diagrammatically show the operation of the indexing unit moving parts into a compartment;

FIGS. 7 through 9 show the drive mechanism of the present invention in successive stages of operation;

FIG. 10 shows another form of the present invention having two indexing units;

FIG. 11 shows another form of the present invention in which gravity is utilized in feeding and removing parts from the storage apparatus; and FIG. 12 shows an end view of another form of the part storage compartment in which a transversely extending extension is provided on the parts supporting shelves to retain parts in the compartment.

With reference to the drawing, the storage apparatus of the present invention, indicated generally at 10, is shown in FIG. 1 as comprising a cylindrically shaped drum 12 having a longitudinal axis 14, an end rim 16, and a hub 18. The drum 12 mounts at its hub 18 on a supporting frame 19 so that it can rotate in opposite directions about its axis 14. A plurality of spaced-apart support shelves 20 are mounted on the drum 12 and extend radially outward from its outer circumferential surface 21. The support shelves 20 form a plurality of part storage compartments 22 which extend lengthwise of the drum 12 and in which various parts such as the ones shown diagrammatically at 26 in FIGS. 5 and 6 can be stored. Each part storage compartment 22 is comprised of adjacent support shelves 20 which are substantially perpendicular to the surface 21 of the drum 12 and extend generally radially of the axis 14.

Circular rails 24 are mounted on the frame 19 in close proximity to the outer edge of the shelves 20 and enable the parts 26 to remain in the compartments 22 as the drum 12 is being rotated. A longitudinal gap 25 (FIG. 1) is formed by aligned separations in the rails 24 to enable a feeding mechanism to move parts 26 lengthwise in a compartment 22 which is being loaded or unloaded.

FIG. 12 shows another mode of retaining parts 26 in their respective compartments. A compartment 22a is formed from a pair of support shelves 20a and a shelf extension 28 which extends perpendicularly away from the end of each support 20a and terminates intermediate the adjacent support shelves 20a. Suitable space is left between the shelf extension 28 and the adjacent shelf 20a to enable a feeding mechanism to engage each part 26 for movement in the compartment 22a.

A drive mechanism 30, mounted on the frame 19, engages the drum 12 at its rim 16 to provide for intermittent rotation of the drum 12 about its axis 14. As seen in FIG. 1, the drive mechanism 30 rotates the drum 12 in a counter-clockwise direction to successively position the compartments 22 at the gap 25 where parts 26 are loaded into or removed from the compartment. An indexing unit 32 is mounted on the frame 19 and feeds the parts 26 into the respective compartments 22. The indexing unit 32 is also used to remove the parts 26 from the compartment 22.

The drive mechanism 30, shown mounted on the frame 19 in FIG. 1, is shown in greater detail in FIGS. 7 through 9, and includes a pair of linkage arms 34 and 35 which are each pivotally mounted at one end thereof on the support 36 of the frame 19. The linkage arm 34 is mounted inwardly of the linkage arm 35. A stop arm 38 which secures the drum 12 in a stationary position when it is not being rotated is pivotally mounted at its end 40 to the other end of the linkage arm 34. The other end of the linkage arm 35 is pivotally connected to the stop arm 38 at the pivot 42. A drive arm 44 which engages the rim 16 of the drum 12 for rotation thereof is pivotally mounted on the stop arm 38 intermediate its end 40 and the pivot 42. The stop arm 38 is provided at its lower end with a pair of transversely extending drive flanges 46. The drive arm 44 is also provided at its lower end with transversely extending drive flanges 48 (FIG. 3).

A plurality of drive pins 50 are mounted on the rim 16 of the drum 12 and are regularly spaced so that each pair of flanges 46 and 48 of the drive mechanism 30 can straddle a pin 50 for driving the drum 12 as shown in FIG. 3.

The drive pins 50 are bolted on the rim 16 of the drum 12 in a spacedapart relation so that the flanges 46 on the stop arm 38 and the flanges 48 on the drive arm 44 can alternately engage a drive pin 50. A cylinder 52 which functions to move the arms 38 and 44 up and down is pivotally mounted on the support 36 at one end thereof and is connected to the stop arm 38 at its other end. A cylinder 54 is provided with plunger 55 which is connected to the drive arm 44 by means of a connecting bar 56 and in response to the operation of the cylinder 54 the drum 12 is rotated in a counter-clockwise direction.

When the plunger 55 of the drive cylinder 54 is fully extended, the drum 12 is rotated an increment of movement so that a compartment 22 is positioned at the gap 25. Each increment of rotation of the drum 12 results in an adjacent compartment 22 replacing a prior compartment 22 at the gap 25. In other words, the drive 30 and the pins 50 are coordinated with the spacing of the compartments 22 to provide for a circumferential advance of the drum 12 during each indexing a distance equal to the spacing between the centers of ajdacent compartments 22.

Figure 2:
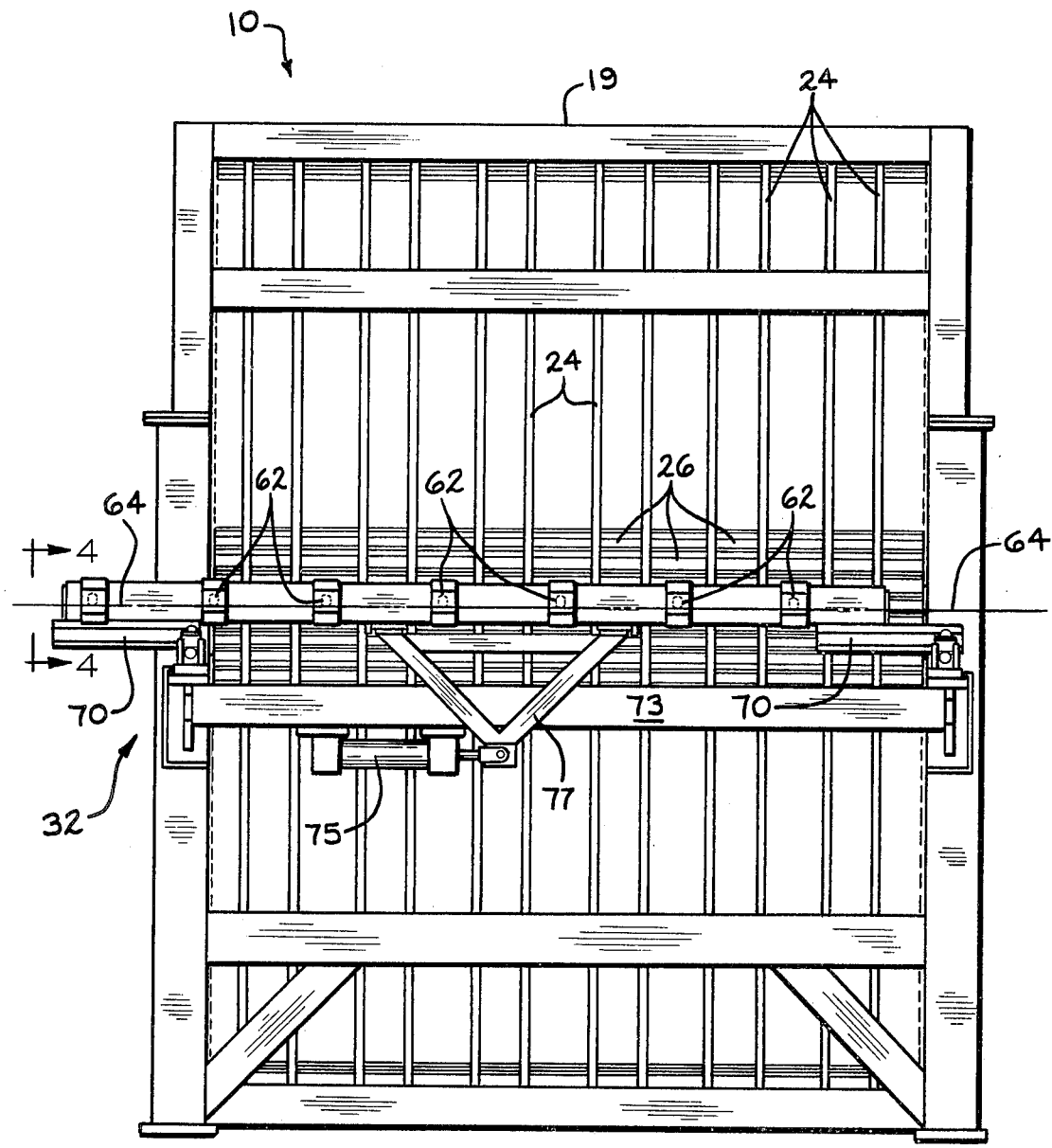
FIG. 2 is a side view of the storage apparatus showing the indexing unit.
Figure 4:
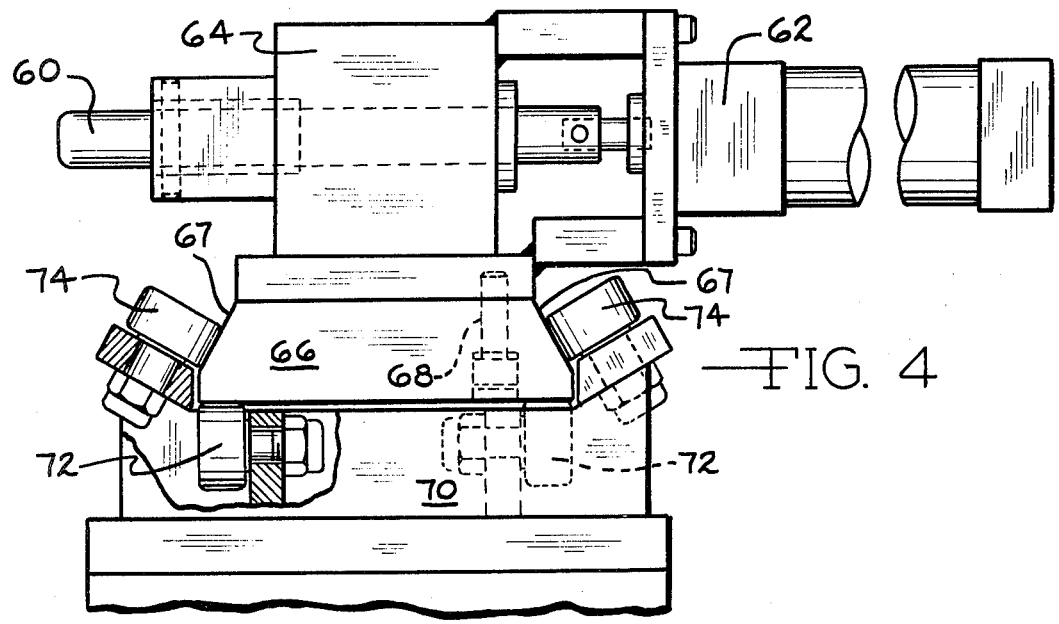
FIG. 4 is an enlarged detail view of the indexing unit in the storage apparatus taken from line 4—4 in FIG. 2.

The indexing unit 32 shown in FIGS. 1, 2 and 4 comprises a plurality of individually extensible and retractable rods 60 which are individually movable in and out relative to an adjacent compartment 22 by piston and cylinder assemblies 62. The rods 60 are located in an in-line spaced-apart relationship to engage the parts 26 that will be stored in the compartment 22. FIG. 4 shows in greater detail the components of the indexing unit 32. Each cylinder 62 mounts on a rod guide 64 which enables the rods 60 to be guidably moved back and forth in the compartments 22. Bolts 68 (one shown) secure the rod guide 64 to a base 66 having beveled sides 67. The base 66 movably mounts on a pair of beds 70 which are mounted on each end of a support brace 73 that is secured to the frame 19. Transfer rollers 72 are affixed on the bed 70 and enable the rod guide 64 to easily move back and forth on the bed 70. Guide rollers 74 are mounted on the brace 73 and bear against the beveled edges 67 of the base 66 to maintain proper alignment of the rod guide 64 as it is moved. A cylinder 75 (FIG. 2) mounted on the brace 73 is connected to the rod guide 64 by a bracket 77 and is operable to provide for reciprocal movement of the indexing unit 32 parallel to the longitudinal axis 14.

FIG. 10 shows another variation of the present invention in which the storage apparatus 10 is provided with a pair of indexing units 32 and 32a. The indexing unit 32a is mounted in the same manner as the indexing unit 32 but in a generally diametrically opposite face-to-face relation. The units 32 and 32a can be operatively operated to provide for a "first in-first out" operation of the apparatus 10. When only a single unit 32 is used, the apparatus 10 operates on a "first in-last out" basis.

In operation of the storage apparatus 10, the drive mechanism 30 will rotate the drum 12 to position a compartment 22 at the gap 25 to enable the indexing unit 32 to feed parts 26 into the compartment 22. FIGS. 7 through 9 show most clearly the operation of the drive mechanism 30. In FIG. 7, the drive mechanism 30 is in a position ready to rotate the drum 12 in a counterclockwise direction. The cylinder 52 is extended raising the stop arm 38 so that the flanges 46 are disengaged from an associated drive pin 50. Simultaneously, the drive arm 44 is raised so that its flanges 48 engage a drive pin 50. With the cylinder 52 extended, the drive cylinder 54 operates to move the drive arm 44 in a left to right direction as viewed in FIG. 8, thus, rotating drum 12 in the counter-clockwise direction. To prevent undesired movement of the drum 12, the cylinder 52 is retracted to bring down the arm 38 so that the flanges 46 engage a drive pin 50. The cylinder 52 at the same time moves the drive arm 44 down disengaging the flanges 48 with the pin 50 (FIG. 9). Thus, the drive arm 44 can be retracted by the cylinder 54 to its original position shown in FIG. 7. The above steps are repeated until the desired compartment 22 is properly located in the gap 25.

When a compartment 22 is properly positioned in the gap 25, the indexing unit 32 can feed the parts 26 into the storage apparatus 10 (FIGS. 5 and 6). A part 26 is positioned adjacent the compartment 22 by such means as a conveyor 78. The indexing unit 32 is moved by the cylinder 75 to the left-most position as seen in FIG. 5. All rods 60 are then simultaneously extended by the cylinders 62 and the indexing unit 32 is moved by the cylinder 75 into engagement with the part 26 which is thus moved into the compartment 22 as seen in FIG. 6. To move the first part further into the compartment 22 and to feed additional parts 26 therein, the rods 60 are retracted and the indexing unit 32 is moved to the left-most position as shown in FIG. 5 to engage another part 26 to be moved into the compartment 22 and to move the first part 26 further inward. This sequence of operations is repeated until the compartment 22 is filled. The drum 12 is then rotated to position another compartment 22 in the gap 25 to be filled in a similar manner. The sequence of operations is simply reversed to remove the parts 26 from the apparatus 10.

Another embodiment of the present invention is shown in FIG. 11 in which storage apparatus 10a, identical to the apparatus 10 described herein, is inclined relative to the horizontal, represented by the line 81, utilizing gravity feed to thus eliminate need for the indexing unit 32. The apparatus 10a has a part separating assembly 83 which maintains the parts 26 in spaced-apart relationship. Gates 82 and 84 are provided to respectively allow the entrance and removal of the parts 26 from the apparatus 10a. A part 26 is fed to the storage apparatus 10a adjacent the gate 82 which opens to allow the part 26 to slide downward in the compartment 22b and against the gate 84. When the compartment 22a is filled with parts 26, the drum 12a is rotated to position another compartment 22a to receive parts 26. When it is desired to remove the parts 26 from the apparatus 10a, the gate 84 is simply opened to allow the parts 26 to slide out under the force of gravity.

As can be seen, a unique storage apparatus 10 is provided comprising a drum 12 mounted for rotation of a frame 19 about its longitudinal axis and having a plurality of outwardly extending part storage compartments 22. Thus, a plurality of parts 26 may be fed into the compartments in an orderly fashion at one location. When needed, the parts 26, can be easily removed one-by-one at a single location by indexing the drum 12 to align filled compartments with the unit 32. The rods 24 can be used to separate parts in a compartment 22 when the part is shaped to project out of the compartment 22.

What is claimed:

1. Apparatus for storing parts comprising a frame, a cylindrical structure having a longitudinal axis, said structure being mounted on said frame for rotation in opposite directions about said longitudinal axis, a plurality of spaced-apart support shelves on said structure, each of said shelves extending substantially radially with respect to the axis of said structure, said support shelves forming a plurality of part storage compartments, each of said storage compartments being formed from a pair of adjacent support shelves and extending longitudinally of said cylindrical structure for storage of a plurality of parts therein, each of said compartments being open on the radially outer side thereof, a drive mechanism mounted on said frame and engaged with said cylindrical structure for intermittently rotating the structure in response to the operation of said drive mechanism, retaining means extending substantially circumferentially of said cylindrical structure and located radially outwardly of said compartments for retaining parts in said compartments during rotation of said structure, and a part indexing unit mounted on said frame and disposed in substantially horizontal alignment with one of said compartments for moving parts therein and longitudinally thereof, said indexing unit comprising a plurality of spaced-apart retractable rods movable from positions radially outwardly of said one compartment to positions extending into said one compartment through said radially outer side thereof, said rods being movable longitudinally of said compartment for advancing parts therein and being retractable out of said one compartment to positions in a clearance relation with said cylindrical structure during rotation thereof.

2. Storage apparatus according to claim 1 wherein said retaining means comprises a plurality of spaced-apart circular rails mounted in close proximity to the outer periphery of said support shelves to thereby retain said parts in said compartments, said rails terminating on opposite sides of said one compartment.

3. Storage apparatus according to claim 1 wherein each of said support shelves is provided with an extension forming a lip extending toward an adjacent shelf and terminating in a spaced relation therewith for retaining parts in the compartment formed between the adjacent shelves.

4. Storage apparatus according to claim 1 further including a second indexing unit, said second indexing unit being mounted on said frame on the diametrically opposite side of said cylindrical structure from said one indexing unit.

5. Storage apparatus according to claim 1 further including means maintaining said rods in a predetermined spaced-apart relation, and means providing for independent movement of each of said rods radially inwardly and outwardly relative to said cylindrical structure.

6. Storage apparatus according to claim 1 further including a plurality of drive pins mounted on said cylindrical structure in a circular pattern extending about the axis thereof, said drive pins being spaced apart in directions circumferentially of said cylindrical structure, and wherein said drive mechanism comprises means engageable with successive ones of said pins to incrementally rotate said structure, said rotating means comprising a stop arm, a drive arm pivotally mounted on said stop arm, each of said arms having pin engaging means mounted thereon, actuating means coupled to one of said arms for moving said arms into engagement with a corresponding pin, and propelling means engaged with one of said arms providing for incremental rotation of said structure.

* * * * *